United States Patent
Oki et al.

(10) Patent No.: US 9,679,208 B2
(45) Date of Patent: Jun. 13, 2017

(54) TRAFFIC LIGHT DETECTING DEVICE AND TRAFFIC LIGHT DETECTING METHOD

(71) Applicant: Nissan Motor Co., Ltd., Yokohama-Shi, Kanagawa (JP)

(72) Inventors: Takahiko Oki, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/124,534

(22) PCT Filed: Mar. 10, 2014

(86) PCT No.: PCT/JP2014/056195
§ 371 (c)(1),
(2) Date: Sep. 8, 2016

(87) PCT Pub. No.: WO2015/136601
PCT Pub. Date: Sep. 17, 2015

(65) Prior Publication Data
US 2017/0017850 A1    Jan. 19, 2017

(51) Int. Cl.
*G06K 9/00* (2006.01)
*G06K 9/20* (2006.01)
*G06K 9/46* (2006.01)

(52) U.S. Cl.
CPC ......... *G06K 9/00825* (2013.01); *G06K 9/209* (2013.01); *G06K 9/2036* (2013.01); *G06K 9/4652* (2013.01); *G06K 9/4661* (2013.01)

(58) Field of Classification Search
CPC .. G06K 9/00825; G06K 9/209; G06K 9/2036; G06K 9/4661; G06K 9/4652
See application file for complete search history.

(56) References Cited

U.S. PATENT DOCUMENTS

2007/0225895 A1*  9/2007  Ma ............. G06K 9/00785
                                                     701/117
2008/0187318 A1*  8/2008  Osanai ............ H04B 10/116
                                                     398/129
(Continued)

FOREIGN PATENT DOCUMENTS

JP    2005301518 A   10/2005
JP    2007161189 A    6/2007
(Continued)

OTHER PUBLICATIONS

Wu, Zhipeng, et al., "Hybrid LED Traffic Light Detection Using High-Speed Camera", 2016 IEEE 19th International Conference on Intelligen Transportation Systems (ITSC), Nov. 1, 2016, pp. 1235-1241.

Primary Examiner — Aaron W Carter
(74) Attorney, Agent, or Firm — Young Basile Hanlon & MacFarlane, P.C.

(57) ABSTRACT

A traffic light detecting device includes an image capturing unit configured to repeatedly capture images in a travelling direction of a vehicle to obtain a series of multiple images and a traffic light detecting unit configured to detect traffic lights from the images. The traffic light detecting unit detects phase information of an electric power system used in an area around the vehicle including the traffic lights from a cycle of a luminance variation in the series of multiple images and extracts from the images a synchronized pixel with a luminance which varies in synchronization with an alternating current cycle of electric power supplied to the traffic light by using the phase information of the electric power system. The traffic light detecting device judges from the synchronized pixel whether or not the traffic light is present.

6 Claims, 7 Drawing Sheets

(56) References Cited

U.S. PATENT DOCUMENTS

| | | | | |
|---|---|---|---|---|
| 2009/0278933 A1* | 11/2009 | Maeda | ............... | G07C 5/0866 |
| | | | | 348/148 |
| 2012/0288146 A1* | 11/2012 | Kido | ............... | G06K 9/00805 |
| | | | | 382/103 |
| 2012/0288149 A1* | 11/2012 | Kido | ............... | G06K 9/00805 |
| | | | | 382/103 |
| 2013/0038754 A1* | 2/2013 | Watarai | ............... | H04N 5/77 |
| | | | | 348/231.3 |
| 2013/0229520 A1* | 9/2013 | Aimura | ............ | G06K 9/00825 |
| | | | | 348/148 |
| 2015/0117715 A1* | 4/2015 | Murao | ............. | G06K 9/00825 |
| | | | | 382/104 |
| 2015/0186734 A1* | 7/2015 | Nakagawa | ......... | G06K 9/00791 |
| | | | | 382/104 |
| 2015/0210275 A1* | 7/2015 | Huberman | ........... | B60W 30/00 |
| | | | | 382/104 |
| 2015/0262483 A1* | 9/2015 | Sugawara | ........... | G08G 1/0962 |
| | | | | 340/929 |
| 2016/0006919 A1* | 1/2016 | Aoyama | ............. | H04N 5/2357 |
| | | | | 348/226.1 |
| 2016/0039420 A1* | 2/2016 | Tosaka | ............. | B60W 30/1886 |
| | | | | 701/36 |
| 2016/0371552 A1* | 12/2016 | Oki | .................. | G08G 1/09623 |
| 2017/0017850 A1* | 1/2017 | Oki | .................. | G06K 9/00825 |
| 2017/0024622 A1* | 1/2017 | Mizutani | .......... | G06K 9/00825 |
| 2017/0041591 A1* | 2/2017 | Korogi | ............. | G06K 9/00818 |

FOREIGN PATENT DOCUMENTS

| | | | |
|---|---|---|---|
| JP | 2007286943 A | 11/2007 | |
| JP | 2008134916 A | 6/2008 | |
| JP | 2008293277 A | 12/2008 | |

\* cited by examiner

TRAFFIC LIGHT DETECTING DEVICE AND TRAFFIC LIGHT DETECTING METHOD

TECHNICAL FIELD

The present invention relates to a traffic light detecting device and a traffic light detecting method.

BACKGROUND

There have been heretofore known a traffic light detecting device for detecting a traffic light from an image captured by a camera (see Japanese Patent Application Publication No. 2005-301518). According to Japanese Patent Application Publication No. 2005-301518, a portion indicating a color of a signal lamp is extracted from the image, the circularity indicating how close to a perfect circle the extracted portion is is calculated, and a portion having a higher circularity is detected as a candidate for the signal lamp.

To be detected as a candidate for a signal lamp, the extracted portion needs to have an image size large enough for the circularity to be determined. Thus, the technique in Japanese Patent Application Publication No. 2005-301518 has a difficulty in accurately detecting a distant traffic light the image size of which is too small to determine the circularity.

SUMMARY

The present invention has been made in view of the above problem, and an object thereof is to provide a traffic light detecting device and a traffic light detecting method capable of detecting even a distant traffic light with high accuracy.

A traffic light detecting device according to an aspect of the present invention includes an image capturing unit configured to repeatedly capture an image of surroundings of a vehicle to obtain a series of multiple images and a traffic light detecting unit configured to detect a traffic light from the images. The traffic light detecting unit detects phase information of an electric power system used in an area around the vehicle including the traffic light from a cycle of luminance variation in the series of multiple images and extracts from the images a synchronized pixel with a luminance which varies in synchronization with an alternating current cycle of electric power supplied to the traffic light by using phase information of the electric power system. The traffic light detecting device judges from the synchronized pixel whether or not the traffic light is present.

DETAILED DESCRIPTION OF THE EMBODIMENTS

Figure 1:
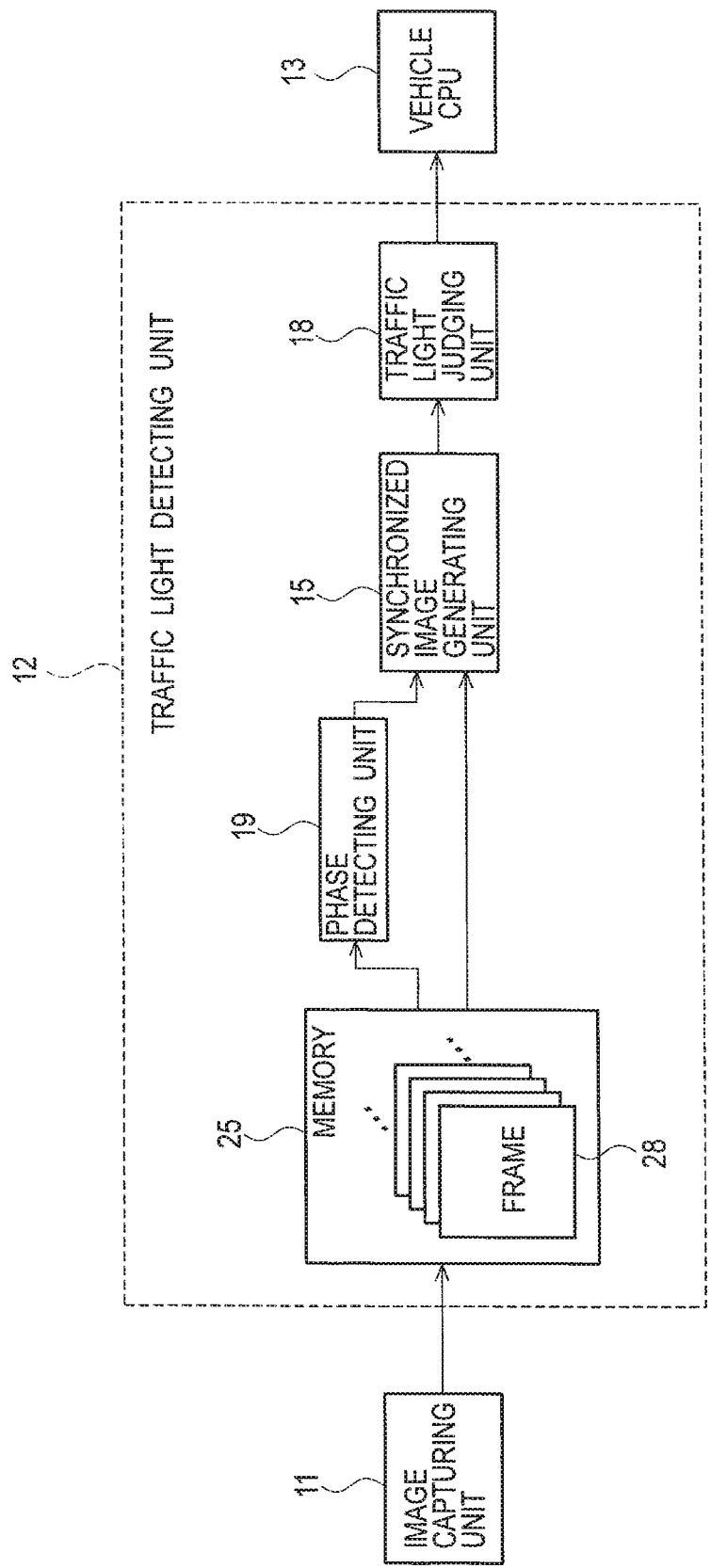
FIG. 1 is a block diagram illustrating an overall configuration of a traffic light detecting device according to an embodiment of the present invention.

With reference to the drawings, descriptions will be provided for an embodiment. In the drawings, the same parts are denoted by the same reference signs, and descriptions thereof are omitted.

With reference to FIG. 1, description will be provided for an overall configuration of a traffic light detecting device according to the embodiment. The traffic light detecting device is mounted on a vehicle and includes an image capturing unit 11 for capturing an image of surroundings of the vehicle repeatedly with a predetermined time interval to obtain a series of multiple images (frames) and a traffic light detecting unit 12 for detecting a traffic light from the images captured by the image capturing unit 11.

The image capturing unit 11 is a digital camera using a solid-state image sensor, for example, CCD or CMOS, which obtains a digital image for which an image processing can be performed. The digital camera includes a wide-angle lens having a wide angle of view. The imaging range (angle of view) of the image capturing unit 11 includes a travel direction of the vehicle and road shoulders in the right and left directions in the vicinity of the vehicle.

The traffic light detecting unit 12 receives the images (hereinafter referred to as "camera images") obtained by the image capturing unit 11 and detects a position of a traffic light in the camera images. The positional information of a detected traffic light is transferred to another processing operation device (vehicle CPU 13) mounted on the vehicle, which includes, for example, a controller to perform automated driving of the vehicle. The traffic light detecting unit 12 includes a microcontroller including, for example, a CPU, a memory 25, and an input/output unit, which serves as multiple information processing units included in the traffic light detecting device by executing a computer program installed in advance. The traffic light detecting unit 12 repeatedly performs a series of information processes for each series of the multiple camera images (frames) to detect the position of the traffic light from the camera images. The traffic light detecting unit 12 may be included in an ECU which is also used for another control of the vehicle.

The multiple information processing units serving as the traffic light detecting unit 12 includes a phase detecting unit 19, a synchronized image generating unit 15, and a traffic light judging unit 18.

The memory 25 stores a series of multiple camera images (frames) 28 at a time. For example, the memory 25 stores the multiple camera images 28 at a time which are captured during one alternating current cycle of electric power supplied to traffic lights.

The phase detecting unit 19 detects phase information of the electric power system used in the area around the vehicle including a traffic light from a cycle of a luminance variation in the series of the multiple images 28. The phase information of the electric power system in the vicinity of the traffic light is generally common between the signal lamps and other electric lights located around the traffic light. In other words, the phase of electric power supplied to the other electric lights located around the traffic light is generally the same as that of the electric power supplied to the traffic lights. Therefore, the phase detecting unit 19 can detect the phase information of the electric power supplied to the traffic lights from the cycle of the luminance variation in the camera images 28. Note that "the phase information of the electric power system" means the phase information of the commercial power supply.

Figure 3A:
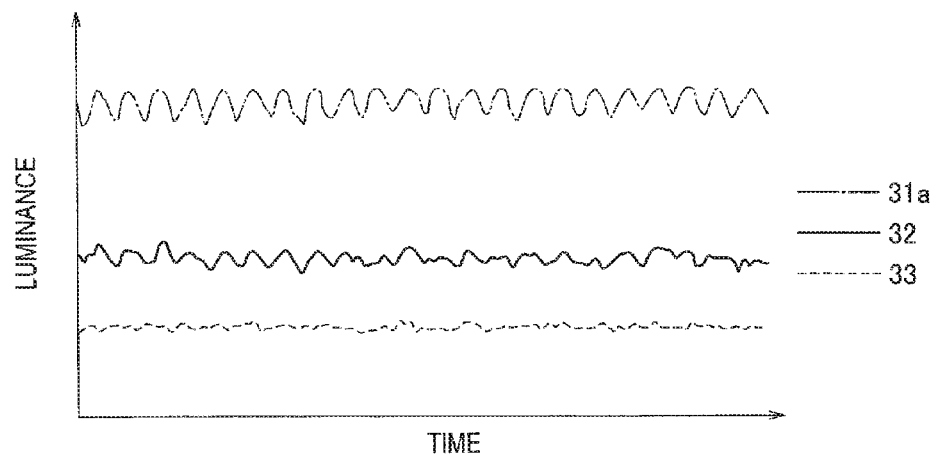
FIG. 3(a) is a graph illustrating a difference in the range of the luminance variation depending on a distance from a vehicle.
Figure 3B:
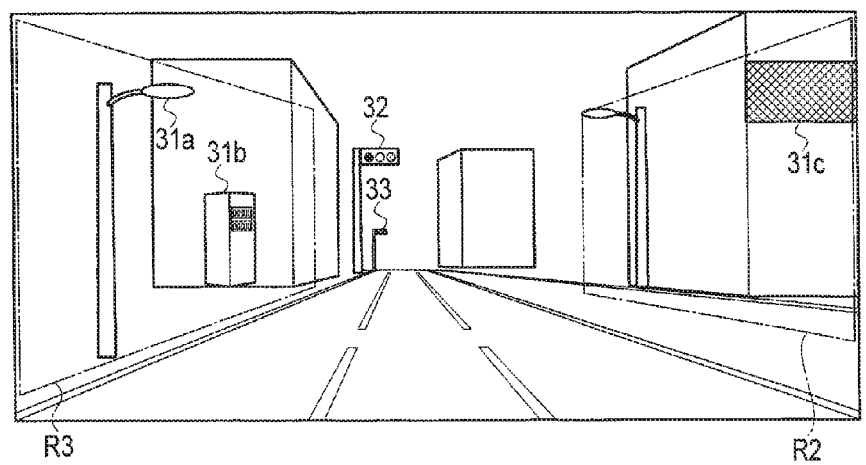
FIG. 3(b) is an example of a camera image illustrating a streetlight 31a, a vending machine 31b, and a signboard 31c as examples of other electric lights located in the vicinity of the vehicle, and illustrating traffic lights 32 and 33 distant from the vehicle.

For example, FIG. 3(a) is a graph illustrating a difference in the range of the luminance variation depending on a distance from the vehicle, and FIG. 3(b) is a diagram illustrating a streetlight 31a, a vending machine 31b, and a signboard 31c as examples of other electric lights located in the vicinity of the vehicle and also illustrating traffic lights 32 and 33 distant from the vehicle. FIG. 3(a) illustrates the luminance variations of the streetlight 31a, and the traffic lights 32 and 33 illustrated in FIG. 3(b). The ranges of the luminance variations of the other electric lights (the streetlight 31a, the vending machine 31b, and the signboard 31c) located in the vicinity of the vehicle are larger than those of the distant traffic lights (32, 33). In addition, the larger the range of the luminance variation is, the more the detection accuracy of the phase information is improved. Therefore, it is possible to detect with high accuracy the phase information of the electric power supplied to the distant traffic lights (32, 33) from the cycle of the luminance variations of the other electric lights (31a to 31c) located in the vicinity of the vehicle.

Alternatively, the phase detecting unit 19 may select a pixel having the largest range of the luminance variation from all pixels of the camera images and detect the phase information of the electric power system using the selected pixel. This makes the detection accuracy of the phase information the highest. Moreover, the phase detecting unit 19 may detect the phase information of the electric power system by multiplying pixels having a relatively larger range of the luminance variation together.

Note that a modification of the phase detecting unit 19 will be described later with reference to FIG. 4, which efficiently detects the luminance variation of the other electric lights (31a to 31c) located in the vicinity of the vehicle from the current vehicle position and map information of the area around the vehicle.

The synchronized image generating unit 15 extracts from the camera images a synchronized pixel with a luminance which varies in synchronization with the alternating current cycle of the electric power supplied to traffic lights using the phase information of the electric power system detected by the phase detecting unit 19 and generates synchronized images including the extracted synchronized pixel. For example, the synchronized image generating unit 15 generates a reference signal synchronized with the phase of the electric power supplied to the traffic lights using the phase information of the electric power system and performs a synchronization detection process of multiplying the reference signal and a luminance signal of each pixel of the camera images together. From this process, a synchronized pixel with a luminance which varies in synchronization with the alternating current cycle of the electric power supplied to the traffic lights is extracted.

The electric power supplied to the traffic lights is an alternating current power obtained by full-wave rectifying the electric power of the commercial power supply. The luminance of a signal lamp which lights by receiving the supply of the electric power from the commercial power supply varies in the same cycle as the cycle (for example, 100 Hz) of the full-wave rectified alternating current power. For this reason, it is possible to detect the signal lamp which lights by receiving the supply of the electric power from the commercial power supply by extracting from the camera images a synchronized pixel with a luminance which varies in synchronization with the alternating current cycle of the electric power supplied to the traffic lights. The concrete processes will be described later with reference to FIGS. 2 and 8.

When the hue of the synchronized pixel extracted by the synchronized image generating unit 15 is similar to that of a signal color, the traffic light judging unit 18 judges that a traffic light is present at the position of the synchronized pixel. Electric lights which light by receiving the supply of the electric power from the commercial power supply include not only signal lamps of traffic lights but also other electric lights that light on the road, such as the streetlight 31a, the vending machine 31b, and the signboard 31c as illustrated in FIG. 3(b). The synchronized pixels extracted by the synchronized image generating unit 15 may include one extracted from these other electric lights. By the traffic light judging unit 18 judging the similarity in hue between the synchronized pixels and the signal colors, it is possible to exclude these other electric lights from an extraction result made by the synchronized image generating unit 15.

Here, the traffic light judging unit 18 may be configured to judge whether or not a traffic light is present using the position on the images and the luminance of the synchronized pixel, instead of using a hue judging unit that judges whether or not the hue of the synchronized pixel is similar to that of a signal color. By determining positions of traffic lights on the images from map information on the surroundings of the vehicle and matching the determined positions with that of the synchronized pixel, it is possible to exclude these other electrical lights. In addition, by estimating the luminance of a traffic light on the images from the distance from the vehicle to the traffic light, it is also possible to judge that the traffic light is present at a synchronized pixel having the luminance within the estimation.

The traffic light detecting unit 12 outputs to the vehicle CPU 13 the positional information of the pixel group at which the traffic light judging unit 18 judges that a traffic light is present.

Figure 2:
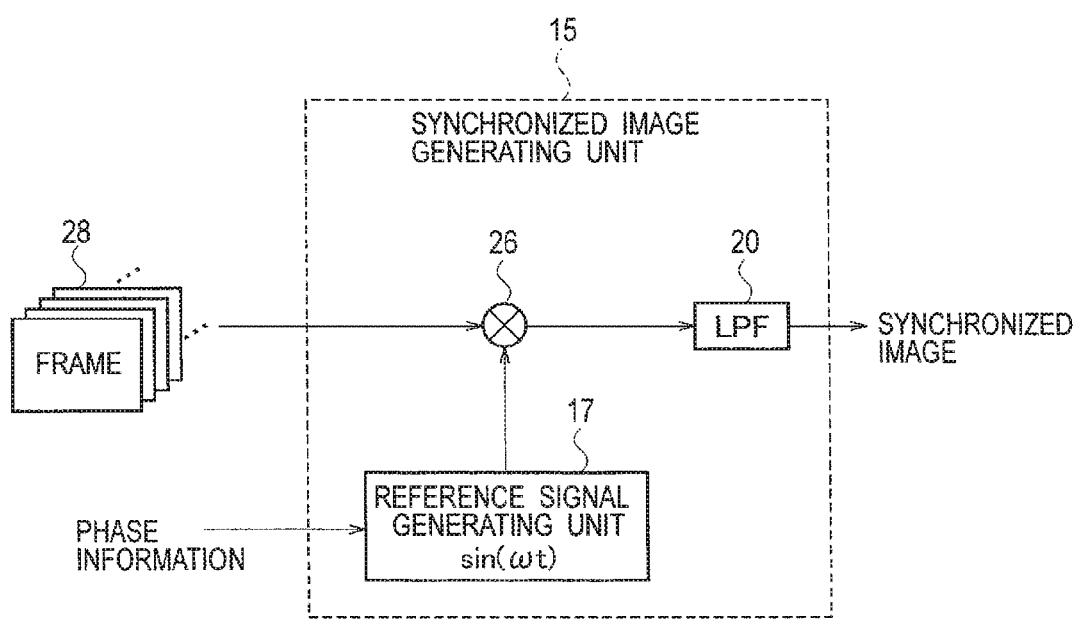
FIG. 2 is a block diagram illustrating a detailed configuration of a synchronized image generating unit 15 illustrated in FIG. 1.

Next, with reference to FIGS. 2 and 8, the synchronized image generating unit 15 will be described in detail. First, with reference to FIG. 2, the configuration of the synchronized image generating unit 15 will be described in detail. The synchronized image generating unit 15 includes, a multiplying unit 26, a low pass filter (LPF) 20, and a reference signal generating unit 17.

The reference signal generating unit 17 generates a reference signal synchronized with the phase of the electric power supplied to the traffic lights using the phase information of the electric power system (the commercial power supply). The multiplying unit 26 multiplies the reference signal and a luminance signal of each pixel of the camera images (frames) 28 read out from the memory 25 together.

The multiplying unit 26 performs the above multiplication for each of the camera images stored at a time in the memory 25. The LPF 20 extracts only the low frequency components by reducing the levels of the frequency components higher than a predetermined cutoff frequency out of the multiplication results by the multiplying unit 26, and outputs a synchronized image including the synchronized pixel.

Figure 8A:
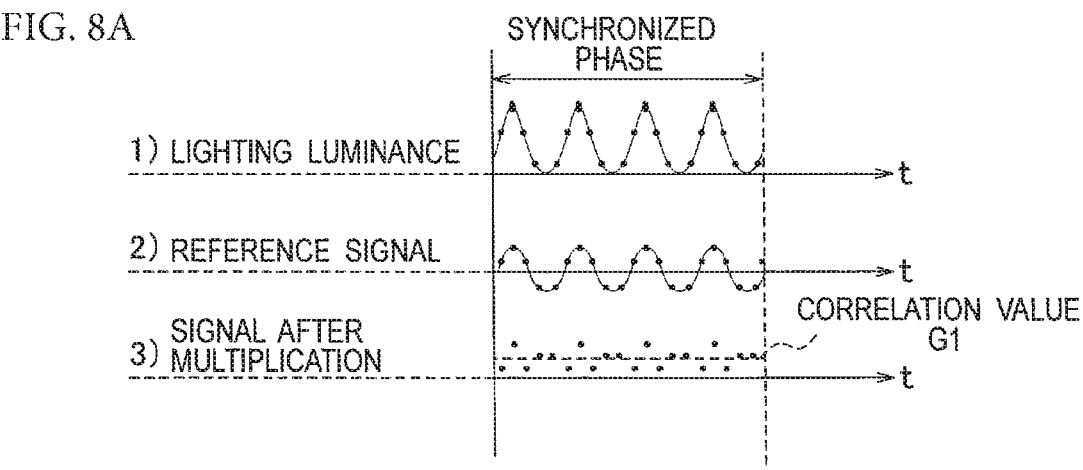
FIGS. 8(a) and 8(b) illustrate a difference in correlation values between when a phase of a reference signal is synchronized and not synchronized, with FIG. 8(a) illustrating a state where the phase of the reference signal is synchronized with that of an electric power and FIG. 8(b) illustrating a state where the phase of the reference signal is inverted with respect to that of the electric power.
Figure 8B:
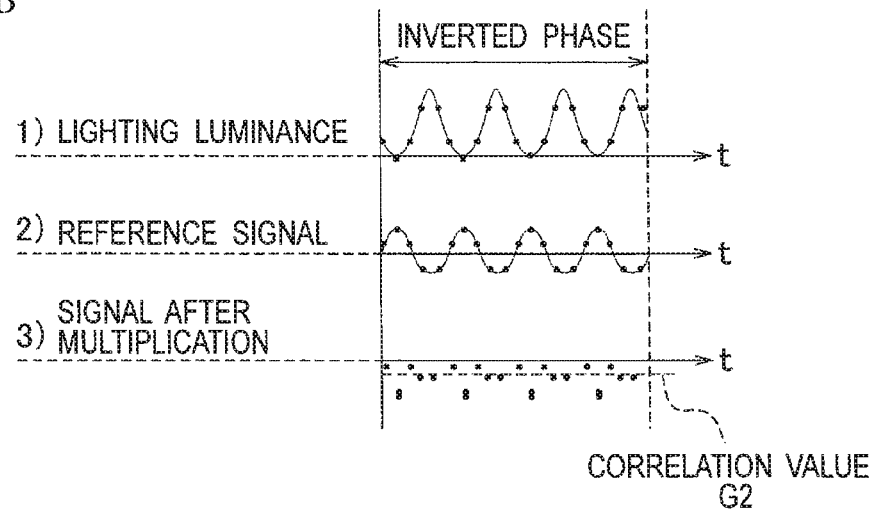

With reference to FIGS. 8(*a*) and 8(*b*), the phase matching of the reference signal will be described. FIG. 8(*a*) illustrates a state where the phase of the reference signal is matched to that of the electric power supplied to the traffic lights. By multiplying 1) the luminance signal of each pixel and 2) the reference signal together in this state, 3) the signal after the multiplication, that is, the luminance of the synchronized pixel and the average value (correlation value G1) of the luminance of the synchronized pixel become the largest.

In contrast, FIG. 8(*b*) illustrates a state where the phase of the reference signal is inverted with respect to that of the electric power supplied to the traffic lights. By multiplying 1) the luminance signal of each pixel and 2) the reference signal together in this state, 3) the signal after the multiplication, that is, the luminance of the synchronized pixel and the average value (correlation value G2) of the luminance of the synchronized pixel become the smallest.

As illustrated in FIG. 3, as the distances from the vehicle to the traffic lights (32, 33) become longer, the luminance of a signal lamp detected by the image capturing unit 11 becomes lower, and the range of the luminance variation becomes smaller. To deal with this, by bringing the phase of the reference signal close to that of the luminance variation of the signal lamp, that is, the phase of the electric power supplied to the traffic lights, it is possible to obtain the high correlation value (G1), which in turn makes it possible to detect the distant traffic lights with high accuracy.

In the embodiment, by using the phase information of the electric power system used in the area around the vehicle including a traffic light, the phase detecting unit 19 detects the phase of the electric power supplied to the traffic lights with high accuracy. This makes it possible to bring the phase of the reference signal closer to the phase of the luminance variation of the signal lamp, that is, the phase of the electric power supplied to the traffic lights.

Figure 4:
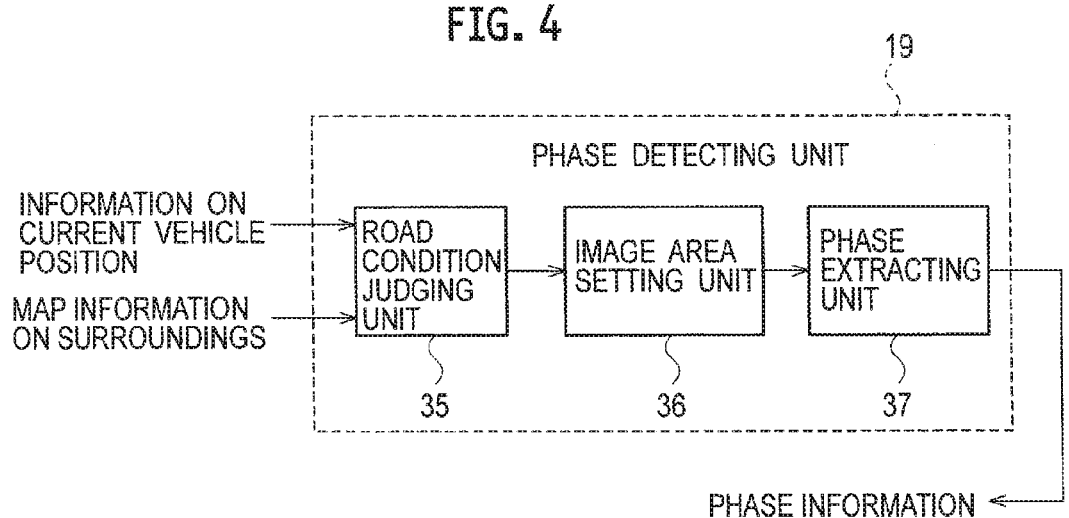
FIG. 4 is a block diagram illustrating a modification of a phase detecting unit 19.

With reference to FIG. 4, the modification of the phase detecting unit 19 will be described. The phase detecting unit 19 includes a road condition judging unit 35, an image area setting unit 36, and a phase extracting unit 37.

Figure 5:
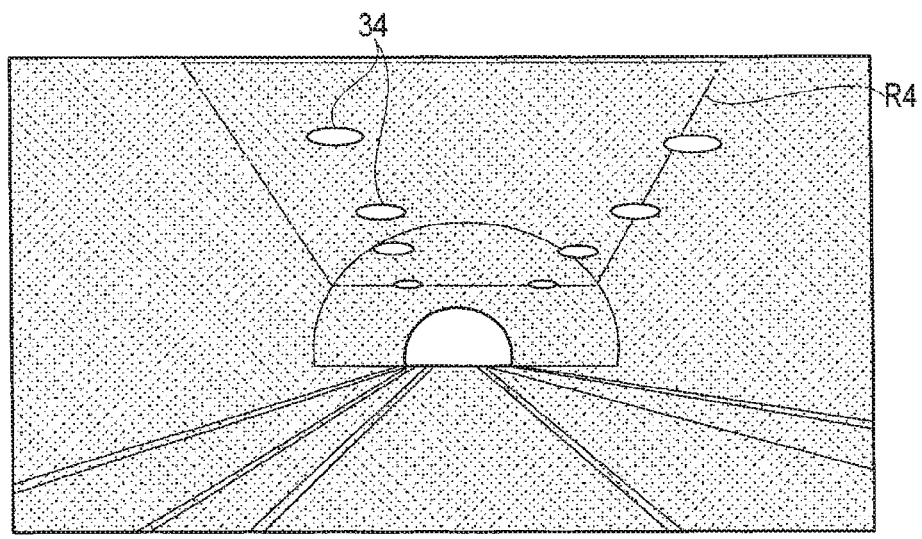
FIG. 5 is a diagram illustrating an example of a camera image captured when the vehicle is travelling in a tunnel.

The road condition judging unit 35 judges the road condition based on the information on the current vehicle position and the map information on the surroundings obtained from the outside or inside of the vehicle using a GPS function and a map database. For example, the road condition judging unit 35 judges whether the road shape in the traveling direction of the vehicle is a straight line as illustrated in FIG. 3(*b*), or a curve to the right or the left. The road condition judging unit 35 also judges whether or not the vehicle is travelling in a tunnel as illustrated in FIG. 5.

The image area setting unit 36 sets an image area in each camera images based on the road condition judged by the road condition judging unit 35. For example, when the road shape is a straight line, the image area setting unit 36 sets areas (R2, R3) in which images of the road shoulders of the road are captured, in the camera images as image areas as illustrated in FIG. 3(*b*). This makes the image areas to include the other electric lights (31*a*, 31*b*, 31*c*) located at the road shoulders of the road. Additionally, when the vehicle is traveling in a tunnel, the image area setting unit 36 sets in the camera images an area R4 in which images of illumination lamps 34 installed on an inner wall of the tunnel are captured, as an image area as illustrated in FIG. 5.

The phase extracting unit 37 extracts the phase information of the electric power system from the image areas (R2 to R4) set by the image area setting unit 36. It is possible depending on the road condition to identify an image area where it is estimated that a light having a large luminance variation is present, which makes it possible to efficiently detect the luminance variations of the other electric lights (31*a* to 31*c*, and 34) located in the vicinity of the vehicle.

Figure 6:
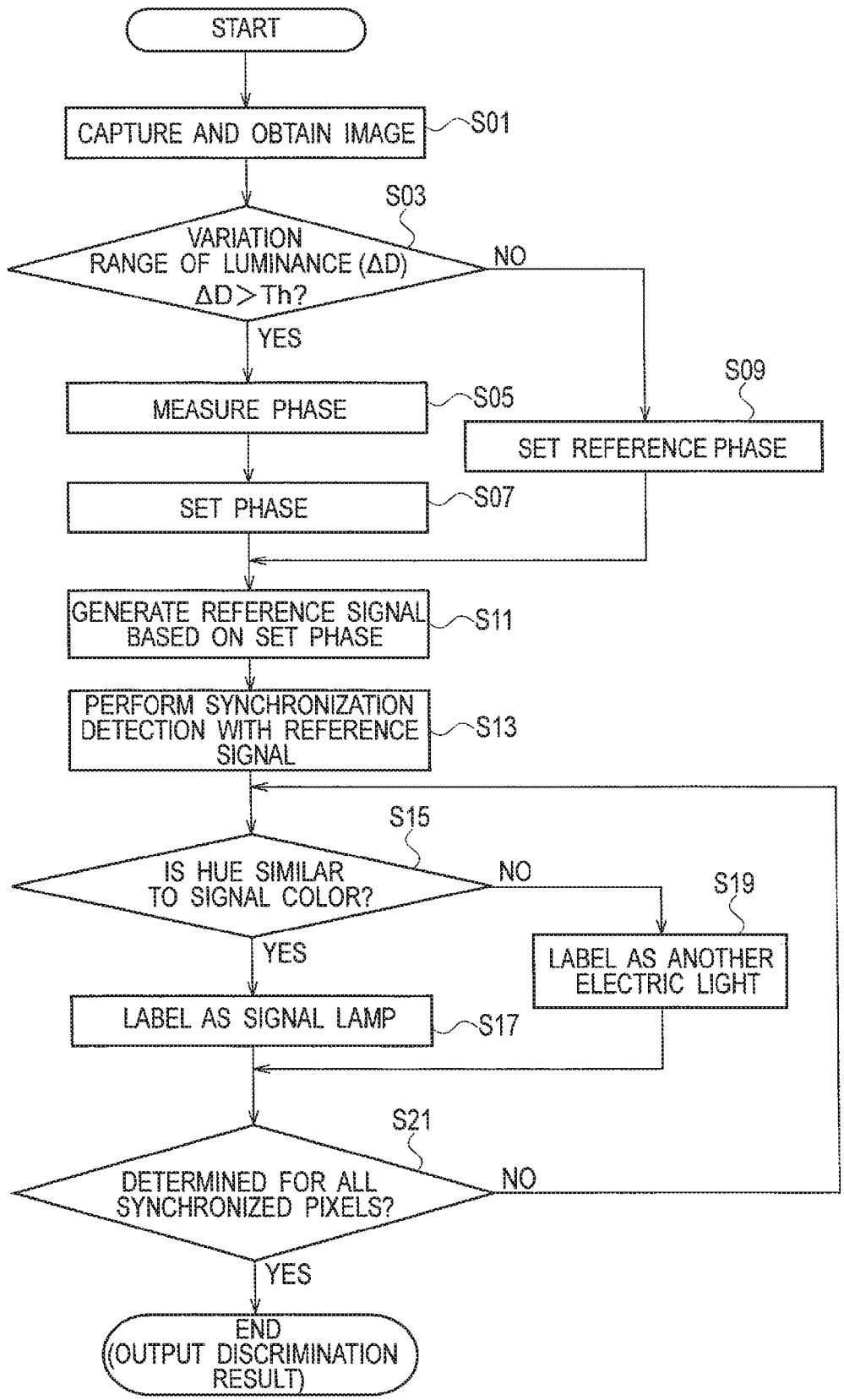
FIG. 6 is a flowchart illustrating an example of a traffic light detecting method using the traffic light detecting device illustrated in FIG. 1.

Next, a traffic light detecting method using the traffic light detecting device illustrated in FIG. 1 will be described with reference to FIG. 6. The operation of the traffic light detecting device illustrated in the flowchart of FIG. 6 starts as soon as the ignition switch of a vehicle turns on and the traffic light detecting device is activated, and it is repeatedly executed until the traffic light detecting device stops.

In step S01, the image capturing unit 11 repeatedly captures images of the surroundings of the vehicle and obtains the series of the multiple camera images. The image capturing unit 11 captures the images multiple times during one alternating current cycle of the electric power supplied to the traffic lights. The obtained image data are transferred to the synchronized image generating unit 15 and temporarily stored in the memory 25.

In steps from S03 to S07, the phase detecting unit 19 detects the phase information of the electric power system used in the area around the vehicle including a traffic light from a cycle of the luminance variation in the series of the multiple camera images 28. As an example, the phase detecting unit 19 detects the phase information of the electric power system depending on whether or not the range ($\Delta D$) of the luminance variation of pixels included in the camera images 28 becomes larger than a predetermined threshold value (Th). For the image areas (R2 to R4) set by the image area setting unit 36, the phase detecting unit 19 according to the modification illustrated in FIG. 4 may judge whether or not the range ($\Delta D$) of the luminance variation becomes larger than the predetermined threshold value (Th), as a matter of course.

First, in step S03, the phase detecting unit 19 selects a certain pixel from the camera images 28 and judges whether or not the range ($\Delta D$) of the luminance variation of the pixel is larger than the predetermined threshold value (Th). When the range ($\Delta D$) is larger than the predetermined threshold value (Th) (YES in S03), it is possible to detect the phase information from the camera images 28 accurately. Then, the processing proceeds to step 05, where the phase detecting unit 19 measures the phase of the luminance variation of the selected pixel. The phase detecting unit 19 sets the measured phase (step S07).

On the other hand, when the range ($\Delta D$) is not larger than the predetermined threshold value (Th) (NO in S03), it is not possible to detect the phase information accurately from the camera images 28. Therefore, the processing proceeds to step 09, where the phase detecting unit 19 sets a predetermined reference phase. As the predetermined reference phase, a phase measured in step S05 of the control loop at one or more previous time can be used.

The processing proceeds to step S11, where the reference signal generating unit 17 generates a reference signal based on the set phase (S07) or the set reference signal (S09). The processing proceeds to step S13, where the multiplying unit 26 performs the synchronization detection process of multiplying the reference signal and the luminance signal of each pixel in the camera images together. Then, the synchronized pixel is extracted from a low frequency signal obtained by filtering using the LPF20.

The processing proceeds to step S15, where the traffic light judging unit 18 judges whether or not the hue of the synchronized pixel extracted by the synchronized image generating unit 15 is similar to that of a signal color. When the hue of the synchronized pixel is similar to that of a signal color, it is possible to judge that a traffic light is present at the position of the synchronized pixel. Therefore, the processing proceeds to step S17, and the traffic light judging unit 18 labels the synchronized pixel as a traffic light. On the other hand, when the hue of the synchronized pixel is not similar to that of a signal color (NO in S15), it is possible to judge that one of other electric lights is present at the position of the synchronized pixel, instead of a signal lamp. Therefore, the processing proceeds to step S19, and the traffic light judging unit 18 labels the synchronized pixel as one of other electric lights.

The processing proceeds to step S21, the traffic light judging unit 18 judges whether or not the judgments have been made for all the synchronized pixels extracted in step S13 on whether or not each of the synchronized pixels indicates a traffic light. If all the judgments have not finished yet (NO in S21), the procedure returns to step S15, and the hue judging processes (steps S15 to S19) are performed for the remaining synchronized pixels. If all the judgments have finished (YES in S21), where the flowchart in FIG. 6 ends.

As described above, the following operation and effect can be obtained according to the embodiment.

Figure 7A:
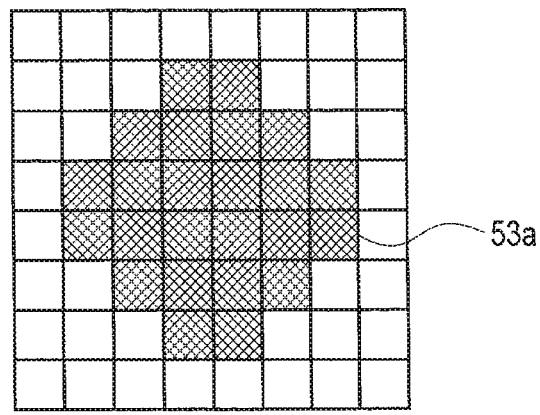
FIG. 7(a) is a diagram indicating the necessary size of a pixel group 53a to detect a candidate for a signal lamp from the circularity.
Figure 7B:
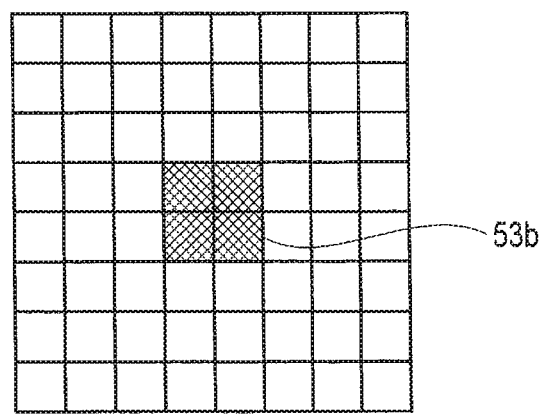
FIG. 7(b) is a diagram indicating the number of synchronized pixels 53b which can be detected in the embodiment.

According to Japanese Patent Application Publication No. 2005-301518, an area with a hue similar to that of a signal lamp is extracted from camera images, and a candidate for a signal lamp is detected based on the circularity of the extracted area. When circularity is used to judge whether or not a signal lamp is present, the area (pixel group 53a) needs to include about the same number of pixels as illustrated in FIG. 7(a). On the other hand, in the traffic light detecting device according to the embodiment, for a traffic light located too far to detect the phase cycle and the range of the luminance variation of the traffic light is small, it is possible to extract a synchronized pixel with a luminance that varies in synchronization with the alternating current cycle of the electric power supplied to the traffic lights, as a candidate of a signal lamp, as described above. This makes it possible to judge whether or not the synchronized pixels 53b indicate a signal lamp, even though the number of the synchronized pixels 53b is too small to judge the circularity as illustrated in FIG. 7(b). In other words, the traffic light detecting device according to the embodiment detects a distant traffic light with high accuracy.

By extracting out of the camera images the synchronized pixels with a luminance which varies in synchronization with the alternating current cycle of the electric power supplied to the traffic lights, it is possible to detect a traffic light without considering the size or the shape of the signal lamp. Accordingly, it is possible to detect even a distant traffic light with high accuracy, even though the image size of the traffic light is too small to determine the circularity.

The phase information of the electric power system in the area around a vehicle is generally common between signal lamps and other electric lights located around the traffic light. For this reason, the phase detecting unit 19 detecting the phase information of the alternating current power supplied to the traffic lights with high accuracy enables the synchronized image generating unit 15 to extract a synchronized pixel having a small luminance variation with high sensitivity. Thus, the traffic light detecting device detects even a distant traffic light having a small luminance variation with high accuracy.

The larger the range of the luminance variation is the more accurate phase information is detected. Thus, the phase detecting unit 19 may detect the phase information of the electric power system using a pixel having the largest range of the luminance variation out of the pixels included in the camera images. This makes it possible to detect the phase information of the alternating current power supplied to the traffic lights with high accuracy from the camera images.

As illustrated in FIG. 3(b), the range of the luminance variation of the other electric lights including the signboard 31c, the vending machine 31b, and the street light 31a located at the road shoulders of the road is larger than the distant traffic lights (32, 33). Therefore, the phase detecting unit 19 may detect the phase information of the electric power system from the areas (R2, R3) where images of the road shoulders of the road are captured in the series of the multiple camera images. This makes it possible to use a pixel having a large range of the luminance variation to detect the phase information of the electric power system.

As illustrated in FIG. 5, when the vehicle is traveling in a tunnel, there are generally illumination lamps 34 installed on the inner wall of the tunnel instead of electric lights including a signboard, a vending machine, and a streetlight on the road shoulders of the road. Therefore, the phase detecting unit 19 may detect the phase information of the electric power system from the area R4 in the series of the multiple camera images, where images of the illumination lamps 34 installed on the inner wall of the tunnel are captured. This makes it possible to use a pixel having a large range of the luminance variation to detect the phase information of the electric power system.

Although the embodiment of the present invention has been mentioned as described above, one should not understand that the statements and the drawings as part of the disclosure limit the present invention. From this disclosure, various modified embodiments, examples, and operation techniques will be apparent to those who skilled in the art.

FIG. 3(b) illustrates the image areas (R2, R3) when the road shape in front of the vehicle is a straight line. When the road shape in front of the vehicle is a curve to the right or the left, for the areas where the images of the road shoulders are captured, the opposite side from the curving direction is larger than the curving side. The sizes and shapes of the left and right image areas (R2, R3) may be changed depending on the direction of the curve. Alternatively, the image area R4 in FIG. 5 may be used besides for a tunnel. For example, a traffic light located in the vicinity of the vehicle may be captured in the image area R4 in FIG. 5. Thus, the image area R4 may also be used when the vehicle is travelling other than in a tunnel. Moreover, the image area R4 in FIG. 5 and the image areas (R2, R3) in FIG. 3(b) may be set in parallel.

REFERENCE SIGNS LIST 11 image capturing unit
12 traffic light detecting unit
15 synchronized image generating unit (synchronized pixel extracting unit)
17 reference signal generating unit
18 traffic light judging unit
28 camera image (image)
33, 32 traffic light
53b synchronized pixel
R2 to R4 image area

The invention claimed is:

1. A traffic light detecting device comprising:
a camera mounted on a vehicle and configured to repeatedly capture an image of surroundings of the vehicle to obtain a series of multiple images; and
a traffic light detecting circuit configured to detect a traffic light from the images, wherein
the traffic light detecting circuit includes:
   a phase detecting unit configured to detect phase information of an electric power system used in an area around the vehicle including the traffic light from a cycle of a luminance variation of other electric light except the traffic light in the series of multiple images,
   a synchronized pixel extracting unit configured to extract from the images a synchronized pixel with a luminance which varies in synchronization with an alternating current cycle of electric power supplied to the traffic light by using the phase information of the electric power system, and
   a traffic light judging unit configured to judge from the synchronized pixel whether or not the traffic light is present.

2. The traffic light detecting device according to claim 1, wherein the phase detecting unit detects the phase information of the electric power system by using a pixel having a largest range of a luminance variation.

3. The traffic light detecting device according to claim 1, wherein the phase detecting unit detects the phase information of the electric power system from an area where an image of a road shoulder of a road is captured in the series of multiple images.

4. The traffic light detecting device according to claim 1, wherein when the vehicle is traveling in a tunnel, the phase detecting unit detects the phase information of the electric power system from an area where an image of an illumination lamp installed on an inner wall of the tunnel is captured in the series of multiple images.

5. The traffic light detecting device according to claim 1, wherein:
the traffic light judging unit includes a hue judging unit configured to judge whether or not a hue of the synchronized pixel is similar to a hue of a signal color, and
the traffic light judging unit judges that the traffic light is present at a position of the synchronized pixel when the hue of the synchronized pixel is similar to the hue of the signal color.

6. A traffic light detecting method, comprising:
repeatedly capturing an image of surroundings of a vehicle to obtain a series of multiple images;
detecting phase information of an electric power system used in an area around the vehicle including a traffic light from a cycle of a luminance variation of other electric light except the traffic light in the series of multiple images;
extracting from the images a synchronized pixel with a luminance which varies in synchronization with an alternating current cycle of the electric power system by using the phase information of the electric power system; and
judging from the synchronized pixel whether or not the traffic light is present.

* * * * *